(12) United States Patent
Gong et al.

(10) Patent No.: US 12,488,638 B2
(45) Date of Patent: Dec. 2, 2025

(54) GENERATION OF RUNNING LOG FOR AUTONOMOUS VEHICLE

(71) Applicant: APOLLO INTELLIGENT CONNECTIVITY (BEIJING) TECHNOLOGY CO., LTD., Beijing (CN)

(72) Inventors: Wei Gong, Beijing (CN); Wenlong Rao, Beijing (CN); Lin Qiao, Beijing (CN); Yingnan Liu, Beijing (CN); Yongbo Wang, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 395 days.

(21) Appl. No.: 18/084,858

(22) Filed: Dec. 20, 2022

(65) Prior Publication Data
US 2023/0118195 A1    Apr. 20, 2023

(30) Foreign Application Priority Data
Dec. 23, 2021    (CN) .......................... 202111592021.3

(51) Int. Cl.
*G07C 5/06* (2006.01)
(52) U.S. Cl.
CPC ..................................... *G07C 5/06* (2013.01)
(58) Field of Classification Search
CPC .................................. G06Q 50/40; G07C 5/06
USPC ............................................................ 701/1
See application file for complete search history.

(56) References Cited

U.S. PATENT DOCUMENTS

| | | | |
|---|---|---|---|
| 2014/0229391 | A1 | 8/2014 | East, III et al. |
| 2019/0004854 | A1* | 1/2019 | Yang .................... G05D 1/0088 |
| 2019/0361432 | A1 | 11/2019 | Levinson et al. |
| 2020/0349496 | A1 | 11/2020 | Irwin et al. |
| 2020/0409369 | A1* | 12/2020 | Zaytsev ............... G05D 1/0212 |
| 2021/0181762 | A1 | 6/2021 | Zhao et al. |

(Continued)

FOREIGN PATENT DOCUMENTS

| | | |
|---|---|---|
| CN | 108292134 A | 7/2018 |
| CN | 112147990 A | 12/2020 |
| CN | 113065043 A | 7/2021 |

(Continued)

*Primary Examiner* — Navid Z. Mehdizadeh
*Assistant Examiner* — Vincent Feng
(74) *Attorney, Agent, or Firm* — Leydig, Voit & Mayer, Ltd.

(57) ABSTRACT

A method for generating a running log for an autonomous vehicle is provided. The method includes: generating running log information based on task recognition information and at least one running event of each autonomous vehicle of at least one autonomous vehicle; and displaying a graphical interface corresponding to the running log information, where for each autonomous vehicle of the at least one autonomous vehicle. The graphical interface includes a task element and at least one event element that are configured for the autonomous vehicle, where the task element includes the task recognition information of the autonomous vehicle. The at least one event element corresponds to the at least one running event of the autonomous vehicle, respectively, and the at least one event element is associated with the task element.

12 Claims, 3 Drawing Sheets

(56) References Cited

U.S. PATENT DOCUMENTS

2021/0263524 A1    8/2021    Ackenhausen et al.

FOREIGN PATENT DOCUMENTS

| CN | 113077649 A | 7/2021 |
| JP | 2020166756 A | 10/2020 |
| KR | 20010105011 A | 11/2001 |
| KR | 20150069623 A | 6/2015 |

* cited by examiner

GENERATION OF RUNNING LOG FOR AUTONOMOUS VEHICLE

CROSS-REFERENCE TO RELATED APPLICATIONS

This application claims priority to Chinese Patent Application No. 202111592021.3, filed on Dec. 23, 2021, the entire contents of which are hereby incorporated by reference.

TECHNICAL FIELD

The present disclosure relates to the technical field of intelligent transportation, in particular to the technical field of autonomous driving, and specifically to a method and an apparatus for generating a running log for an autonomous vehicle, an electronic device, a computer-readable storage medium, and a computer program product.

BACKGROUND

An autonomous vehicle relies on collaboration of artificial intelligence, visual computing, radars, monitoring apparatuses, global positioning systems, etc., so that traveling of the vehicle can be implemented without a need for a person to actually control the vehicle on site. Therefore, the autonomous vehicle is one of the main development directions of intelligent transportation in the future.

An autonomous driving dispatching platform is used for performing unified dispatching management on a plurality of autonomous vehicles. How to improve the efficiency of dispatching analysis and problem diagnosis for autonomous vehicles is a technical problem that needs to be solved urgently currently.

The methods described in this section are not necessarily methods that have been previously conceived or employed. It should not be assumed that any of the methods described in this section is considered to be the related art just because they are included in this section, unless otherwise indicated expressly. Similarly, the problem mentioned in this section should not be considered to be universally recognized in any related art, unless otherwise indicated expressly.

SUMMARY

The present disclosure provides a method for generating a running log for an autonomous vehicle, an electronic device and a non-transitory computer-readable storage medium.

According to an aspect of the present disclosure, a method for generating a running log for an autonomous vehicle is provided, the method including: generating running log information based on task recognition information and at least one running event of each of at least one autonomous vehicle; and displaying a graphical interface corresponding to the running log information, where for each autonomous vehicle of the at least one autonomous vehicle, the graphical interface includes a task element and at least one event element that are configured for the autonomous vehicle, where the task element includes the task recognition information of the autonomous vehicle, the at least one event element corresponds to the at least one running event of the autonomous vehicle, respectively, and the at least one event element is associated with the task element.

According to an aspect of the present disclosure, an electronic device is provided, the electronic device including: at least one processor; and a memory communicatively connected to the at least one processor, where the memory stores instructions executable by the at least one processor, the instructions, when executed by the at least one processor, causing the at least one processor to perform actions including: generating running log information based on task recognition information and at least one running event of each of at least one autonomous vehicle; and displaying a graphical interface corresponding to the running log information, where for each autonomous vehicle of the at least one autonomous vehicle, the graphical interface includes a task element and at least one event element that are configured for the autonomous vehicle, where the task element includes the task recognition information of the autonomous vehicle, the at least one event element corresponds to the at least one running event of the autonomous vehicle, respectively, and the at least one event element is associated with the task element.

According to an aspect of the present disclosure, a non-transitory computer-readable storage medium storing computer instructions is provided, where the computer instructions, when executed by a computer, cause the computer to perform actions including: generating running log information based on task recognition information and at least one running event of each of at least one autonomous vehicle; and displaying a graphical interface corresponding to the running log information, where for each autonomous vehicle of the at least one autonomous vehicle, the graphical interface includes a task element and at least one event element that are configured for the autonomous vehicle, where the task element includes the task recognition information of the autonomous vehicle, the at least one event element corresponds to the at least one running event of the autonomous vehicle, respectively, and the at least one event element is associated with the task element.

According to one or more embodiments of the present disclosure, the efficiency of dispatching analysis and problem diagnosis for autonomous vehicles may be improved.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings in the embodiments show embodiments and form a part of the specification, and are used to explain example implementations of the embodiments together with a written description of the specification. The embodiments shown are merely for illustrative purposes and do not limit the scope of the claims. Throughout the accompanying drawings, the same reference numerals denote similar but not necessarily same elements.

DETAILED DESCRIPTION

Figure 1:
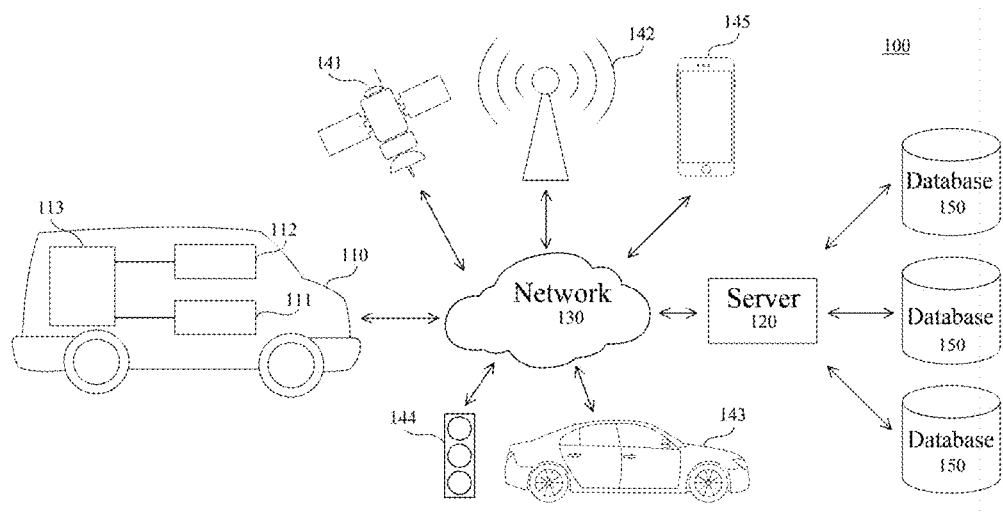
FIG. 1 is a schematic diagram of an example system in which various methods described herein can be implemented according to an embodiment of the present disclosure.

Example embodiments of the present disclosure are described below in conjunction with the accompanying drawings, where various details of the embodiments of the present disclosure are included to facilitate understanding, and should only be considered as example. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first," "second," etc., used to describe various elements are not intended to limit the positional, temporal or importance relationship of these elements, but rather only to distinguish one component from the other. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

An autonomous driving dispatching platform is used for performing unified dispatching management on a plurality of autonomous vehicles, and simultaneously controls dispatching and running of the plurality of autonomous vehicles. In an ideal state, each autonomous vehicle accurately execute each planned running event according to a dispatching plan, but in practice, situations such as temporary stop, being overtaken and forced to decelerate which are inconsistent with the planned running event often occur to the autonomous vehicle. Actual running events of the autonomous vehicle need to be recorded in a running log for the autonomous driving dispatching platform.

In the related art, running logs of a plurality of autonomous vehicles are generally output in a form of text or table on the autonomous driving dispatching platform. Due to a large amount of information and data involved, analysis of the running logs by dispatching management personnel requires a lot of time, thereby leading to a low diagnosis efficiency for possible problems in a dispatching management process.

Based on this, the embodiments of the present disclosure provide a method and an apparatus for generating a running log for an autonomous vehicle, an electronic device, a computer-readable storage medium, and a computer program product, which can improve the efficiency of dispatching analysis and problem diagnosis for autonomous vehicles.

The embodiments of the present disclosure will be described below in detail with reference to the accompanying drawings.

FIG. 1 is a schematic diagram of an example system 100 in which various methods and apparatuses described herein can be implemented according to an embodiment of the present disclosure. Referring to FIG. 1, the system 100 includes a motor vehicle 110, a server 120, and one or more communications networks 130 that couple the motor vehicle 110 to the server 120.

In this embodiment of the present disclosure, the motor vehicle 110 may include a computing device according to embodiments of the present disclosure and/or may be configured to perform the method according to embodiments of the present disclosure.

The server 120 can run one or more services or software applications that enable a communication control method of the vehicle in the present disclosure to be implemented. In some embodiments, the server 120 may further provide other services or software applications that may include a non-virtual environment and a virtual environment. In the configuration shown in FIG. 1, the server 120 may include one or more components that implement functions performed by the server 120. These components may include software components, hardware components, or a combination thereof that can be executed by one or more processors. A user of the motor vehicle 110 may sequentially use one or more client application programs to interact with the server 120, thereby utilizing the services provided by these components. It should be understood that various system configurations are possible, which may be different from the system 100. Therefore, FIG. 1 is an example of the system for implementing various methods described herein, and is not intended to be limiting.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of a server). In various embodiments, the server 120 can run one or more services or software applications that provide functions described below.

A computing unit In the server 120 can run one or more operating systems including any of the above-mentioned operating systems and any commercially available server operating system. The server 120 can also run any one of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from the motor vehicle 110. The server 120 may further include one or more application programs to display the data feeds and/or real-time events via one or more display devices of the motor vehicle 110.

The network 130 may be any type of network well known to those skilled in the art, and it may use any one of a plurality of available protocols (including but not limited to TCP/IP, SNA, IPX, etc.) to support data communication. As a mere example, the one or more networks 130 may be a satellite communication network, a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and other networks.

The system 100 may further include one or more databases 150. In some embodiments, these databases can be used to store data and other information. For example, one or more of the databases 150 can be used to store information such as an audio file and a video file. The data repository 150 may reside in various locations. For example, a data repository used by the server 120 may be locally in the server 120, or may be remote from the server 120 and may communicate with the server 120 via a network-based or dedicated connection. The data repository 150 may be of different types. In some embodiments, the data repository used by the server 120 may be a database, such as a relational database. One or more of these databases can store, update, and retrieve data from or to the database, in response to a command.

In some embodiments, one or more of the databases 150 may also be used by an application program to store application program data. The database used by the application program may be of different types, for example, may be a key-value repository, an object repository, or a regular repository backed by a file system.

The motor vehicle 110 may include a sensor 111 for sensing the surrounding environment. The sensor 111 may include one or more of the following sensors: a visual camera, an infrared camera, an ultrasonic sensor, a millimeter-wave radar, and a laser radar (LiDAR). Different sensors can provide different detection precision and ranges. Cameras can be mounted in the front of, at the back of, or at other locations of the vehicle. Visual cameras can capture the situation inside and outside the vehicle in real time and present it to the driver and/or passengers. In addition, by analyzing the image captured by the visual cameras, information such as indications of traffic lights, conditions of crossroads, and operating conditions of other vehicles can be obtained. Infrared cameras can capture objects in night vision. Ultrasonic sensors can be mounted around the vehicle to measure the distances of objects outside the vehicle from the vehicle using characteristics such as the strong ultrasonic directivity. Millimeter-wave radars can be mounted in the front of, at the back of, or at other locations of the vehicle to measure the distances of objects outside the vehicle from the vehicle using the characteristics of electromagnetic waves. Laser radars can be mounted in the front of, at the back of, or at other locations of the vehicle to detect edge and shape information of objects, so as to perform object recognition and tracking. Due to the Doppler effect, the radar apparatuses can also measure the velocity changes of vehicles and moving objects.

The motor vehicle 110 may further include a communication apparatus 112. The communication apparatus 112 may include a satellite positioning module that can receive satellite positioning signals (for example, BeiDou, GPS, GLONASS, and GALILEO) from a satellite 141 and generate coordinates based on the signals. The communication apparatus 112 may further include a module for communicating with a mobile communication base station 142. The mobile communication network can implement any suitable communication technology, such as current or developing wireless communication technologies (such as 5G technology), for example, GSM/GPRS, CDMA, LTE etc. The communication apparatus 112 may further have an Internet of Vehicles or vehicle-to-everything (V2X) module, which is configured to implement communication between the vehicle and the outside world, for example, vehicle-to-vehicle (V2V) communication with other vehicles 143 and vehicle-to-infrastructure (V2I) communication with infrastructures 144. In addition, the communication apparatus 112 may further have a module configured to communicate with a user terminal 145 (including but not limited to a smartphone, a tablet computer, or a wearable apparatus such as a watch) by using a wireless local area network or Bluetooth of the IEEE 802.11 standards. With the communication apparatus 112, the motor vehicle 110 may further access the server 120 via the network 130.

The motor vehicle 110 may further include a control apparatus 113. The control apparatus 113 may include a processor that communicates with various types of computer-readable storage apparatuses or media, such as a central processing unit (CPU) or a graphics processing unit (GPU), or other dedicated processors. The control apparatus 113 may include an autonomous driving system for automatically controlling various actuators in the vehicle. The autonomous driving system is configured to control a powertrain, a steering system, a braking system, and the like (not shown) of the motor vehicle 110 via a plurality of actuators in response to inputs from a plurality of sensors 111 or other input devices to control acceleration, steering, and braking, respectively, with no human intervention or limited human intervention. Part of the processing functions of the control apparatus 113 can be implemented by cloud computing. For example, a vehicle-mounted processor can be used to perform some processing, while cloud computing resources can be used to perform other processing. The control apparatus 113 may be configured to perform the method according to the present disclosure. In addition, the control apparatus 113 may be implemented as an example of a computing device of the motor vehicle (client) according to the present disclosure.

The system 100 of FIG. 1 may be configured and operated in various manners, such that the various methods and apparatuses described according to the present disclosure can be applied.

Some embodiments of the present disclosure provide a method for generating a running log for an autonomous vehicle, and the method is applied to an autonomous driving dispatching platform, where the autonomous driving dispatching platform may be a computer, a mobile phone, a notebook computer, a tablet computer, etc. The specific type of the autonomous vehicle is not limited, for example, may be an autonomous bus, an autonomous taxi, an autonomous vending truck, an autonomous sweeper-washer vehicle, an autonomous transport vehicle, etc.

Figure 2:
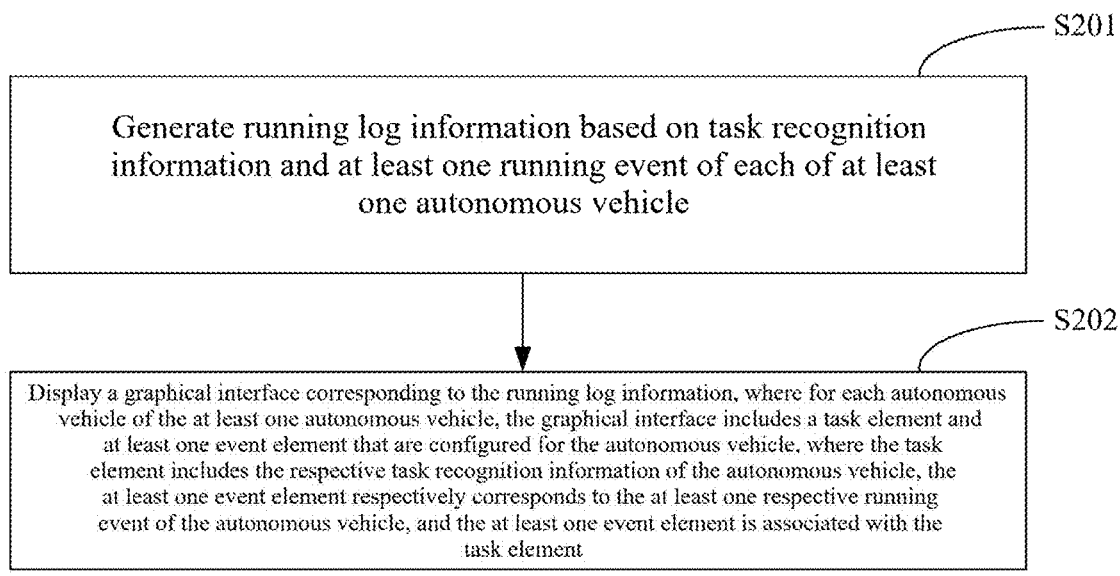
FIG. 2 is a flowchart of a method for generating a running log for an autonomous vehicle according to an embodiment of the present disclosure.

As shown in FIG. 2, a method 200 for generating a running log for an autonomous vehicle according to an embodiment of the present disclosure includes steps S201 and S202 as follows.

In step S201, running log information is generated based on task recognition information and at least one running event of each of at least one autonomous vehicle.

Figure 3:
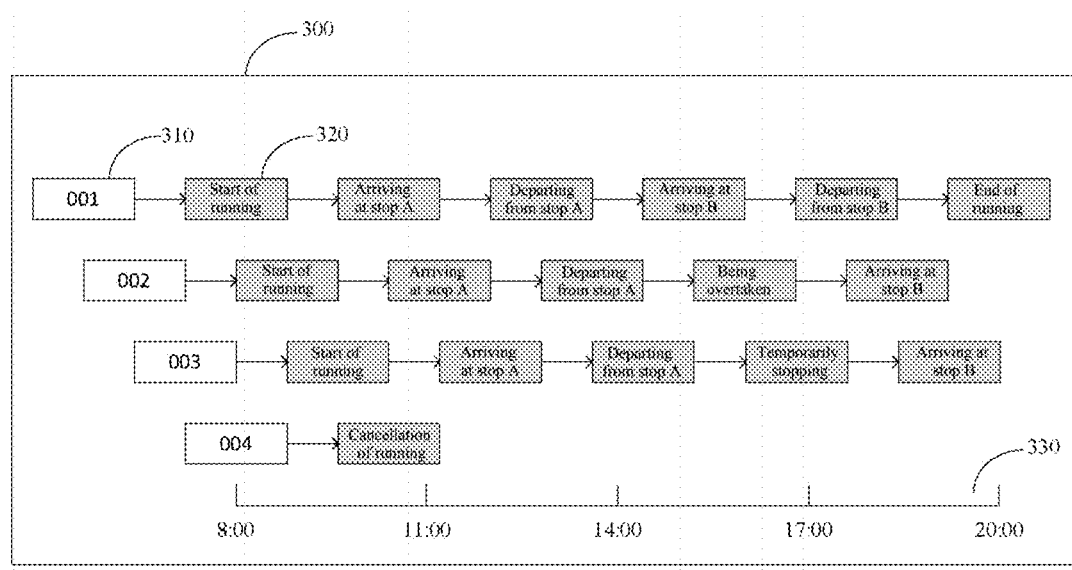
FIG. 3 is a schematic diagram of a graphical interface output by a method for generating a running log for an autonomous vehicle according to some embodiments of the present disclosure.

In step S202, a graphical interface corresponding to the running log information is displayed. As shown in FIG. 3, for each autonomous vehicle of the at least one autonomous vehicle, a graphical interface 300 includes a task element 310 and at least one event element 320 configured for the autonomous vehicle, where the task element 310 includes the respective task recognition information (e.g., a task ID "001") of the autonomous vehicle, the at least one event element 320 corresponds to the at least one respective running event (e.g., "start of running," etc.) of the autonomous vehicle, respectively, and the at least one event element 320 is associated with the task element 310.

In the technical solutions of the embodiments of the present disclosure, the running log information related to the at least one autonomous vehicle is output and displayed in a form of a graphical interface on a display terminal. In the graphical interface, each event element corresponding to each autonomous vehicle is centered on a task element and is associated with the task element. A display scheme of the running log is clear, concise, and easy to understand. Compared with the related art, the technical solutions of the embodiments of the present disclosure enable dispatching management personnel to quickly know key content of the running log, thereby improving the efficiency of dispatching management and problem diagnosis for autonomous vehicles, and further ensuring the reliable, safe, and efficient running of the autonomous vehicles.

The graphical interface is a human-machine interaction interface displayed in a form of graphics. Interface elements are a series of elements in the graphical interface that can meet interaction requirements. For example, the task element 310, the event element 320, and a timeline element 330 shown in FIG. 3 are all the interface elements in the graphical interface 300. As shown in FIG. 3, in the graphical interface 300, each event element 320 corresponding to each autonomous vehicle is associated with the task element 310, and the dispatching management personnel can clearly see an association relationship between the event element 320 and the task element 310 from the graphical interface 300, so that execution progress and execution status of each task can be quickly known.

As shown in FIG. 3, in some embodiments, the graphical interface 300 further includes the timeline element 330. The at least one event element 320 associated with the task element 310 is sequentially arranged based on a time at which the running event corresponding to each of the at least one event element occurs, that is, sequentially arranged in an extending direction of the timeline element 330. The at least one event element 320 associated with the task element 310 is arranged after the task element 310, and the dispatching management personnel may quickly know the time at which each event element 320 occurs and quickly know the associated task from the graphical interface 300, and control a running event associated with the task.

The embodiments of the present disclosure impose limitations neither on a specific presentation method of the interface element in the graphical interface, nor on a specific presentation method of the association relationship, as long as each event element has an obvious association relationship with a corresponding task element such that the dispatching management personnel can quickly control the key content of the running log. For example, each event element may further use the associated task element as an association center to form a tree-shaped association form. In addition, the graphical interface may further include another interface element related or unrelated to the task element, such as a date, on-duty personnel, and a station name.

In some embodiments of the present disclosure, the method for generating a running log further includes: extracting, based on dispatching information of each of the at least one autonomous vehicle, the respective task recognition information.

The dispatching information is running plan information of the autonomous vehicle. The dispatching information includes information about the autonomous vehicle that executes a running plan, such as a license plate number of the autonomous vehicle, and the task recognition information configured for the autonomous vehicle, such as a task ID. An actual running status of the autonomous vehicle may deviate from the running plan, causing the running event to be inconsistent with the planned running event, but the information about the autonomous vehicle and the task recognition information configured for the autonomous vehicle do not change, and therefore, the task recognition information may be obtained based on the dispatching information.

In addition, the dispatching information may further include information about the planned running event of the autonomous vehicle, such as planned start-of-running time, planned end-of-running time, a planned running route, planned stops, and planned arriving time and planned departing time at each planned stop.

In each planned running period of the autonomous vehicle (the running period is, for example, days, weeks, months, etc.), the dispatching information may be input to the autonomous driving dispatching platform by the dispatching management personnel, or may be delivered to the autonomous driving dispatching platform by a cloud server that communicates with the autonomous driving dispatching platform. In addition, the dispatching information may also be stored in a cloud storage device or a local storage device. During each planned running period of the autonomous vehicle, when the method for generating a running log according to the embodiments of the present disclosure needs to be performed, the dispatching information is obtained from the foregoing device.

In the embodiments of the present disclosure, a specific method for the autonomous driving dispatching platform to obtain the running event of the autonomous vehicle is not limited.

In an embodiment of the present disclosure, the method for generating a running log further includes: before generating the running log information, obtaining at least one running event sent by a human-machine interaction device of each autonomous vehicle.

The human-machine interaction (HMI) device is installed in the autonomous vehicle, communicates with the cloud server through a wireless network, and can control the autonomous driving system of the autonomous vehicle according to instructions delivered by the cloud server, so that the autonomous vehicle implements autonomous traveling, such as starting, stopping, accelerating, decelerating, and turning. In addition, the human-machine interaction device can record various running events of the autonomous vehicle.

In this embodiment, the human-machine interaction device communicates with the autonomous driving dispatching platform, and may report the running event of the autonomous vehicle to the autonomous driving dispatching platform.

In another embodiment of the present disclosure, the method for generating a running log further includes: obtaining at least one running event of each autonomous vehicle sent by the cloud server, where the cloud server communicates with the human-machine interaction device of each autonomous vehicle.

Since the cloud server communicates with the human-machine interaction device of each autonomous vehicle, the cloud server may obtain a related running event from the human-machine interaction device of each autonomous vehicle, and report the related running event to the autonomous driving dispatching platform.

An actual running status of the autonomous vehicle may deviate from the running plan, causing the running event to be inconsistent with the planned running event. For example, actual start-of-running time of the autonomous vehicle is inconsistent with the planned start-of-running time, the autonomous vehicle temporarily stops outside a stop for some reasons, the autonomous vehicle cannot reach the stop on time because the autonomous vehicle decelerates to give way when being overtaken, the autonomous vehicle is canceled from running, and so on. These running events also need to be recorded in the running log.

In the embodiments of the present disclosure, the at least one running event includes at least one of the following: start of running, end of running, departure, arrival, temporary stop, on-site shutdown, cancellation of running, being overtaken, or overtaking. A running event may be consistent with the planned running event, may be inconsistent with the planned running event, or may be another running event not related to the planned running event, for example, temporary stop in an emergency.

In some embodiments of the present disclosure, the method for generating a running log further includes: obtaining dispatching information of each of the at least one autonomous vehicle, and step S202 includes: for each of the at least one autonomous vehicle, in response to determining that a first running event in the at least one respective running event matches the respective dispatching information of the autonomous vehicle, displaying a first event element corresponding to the first running event in the graphical interface in a first state; and in response to determining that the first running event does not match the respective dispatching information, displaying the first event element corresponding to the first running event in the graphical interface in a second state, where the second state is different from the first state.

The first running event may be any one of the at least one running event. The second state may differ from the first state in that, for example, a shape and a pattern and/or a filling color of an event element in the graphical interface are different in the two states, as long as attention of the dispatching management personnel can be drawn, and the two states can be clearly distinguished by the dispatching management personnel.

Figure 4:
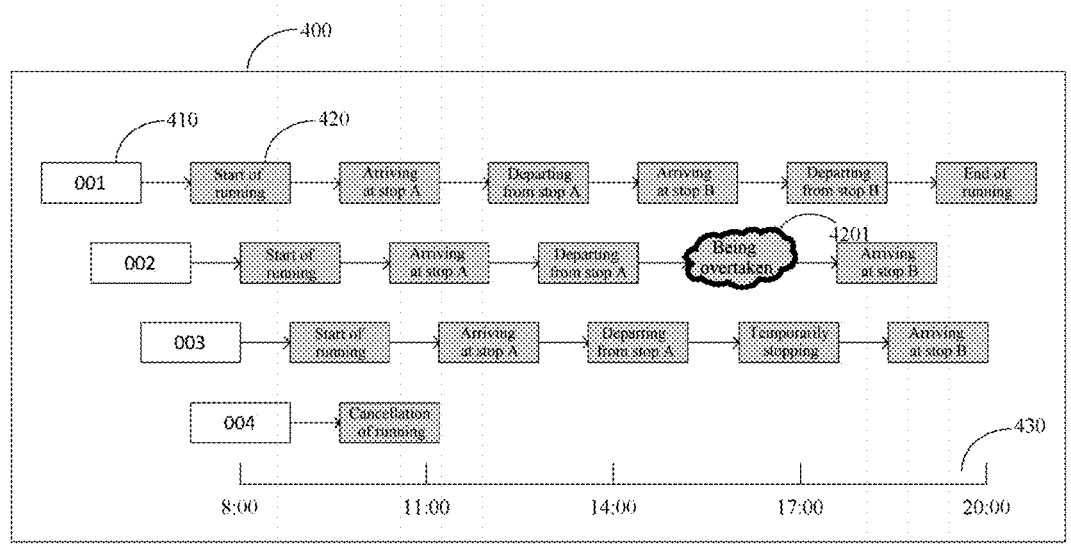
FIG. 4 is a schematic diagram of a graphical interface output by a method for generating a running log for an autonomous vehicle according to some embodiments of the present disclosure.

FIG. 4 is a schematic diagram of a graphical interface output by a method for generating a running log for an autonomous vehicle according to some embodiments of the present disclosure. As shown in FIG. 4, a graphical interface 400 includes a task element 410 and at least one event element 420 that are configured corresponding to each autonomous vehicle. In addition, the graphical interface 400 includes a timeline element 430. Since a running event of "being overtaken" associated with a task ID 002 is inconsistent with a planned running event in the dispatching information, an event element 4201 corresponding to the running event of "being overtaken" is displayed in the graphical interface 400 in the second state, while since another running event 420 in the graphical interface 400 is consistent with the planned running event in the dispatching information, the another running event 420 is displayed in the first state. It can be learned that, in this embodiment, shapes of the first state and the second state are different.

The solution of this embodiment enables the dispatching management personnel to know an unplanned running status of the autonomous vehicle in time, so as to quickly diagnose a problem, and to adjust the running plan of the autonomous vehicle accordingly, thereby ensuring the reliable, safe, and efficient running of the autonomous vehicle.

In some embodiments of the present disclosure, when the running event is inconsistent with the planned running event in the dispatching information, the event element corresponding to the running event may not be displayed in a differentiated state, for example, the event element may be displayed by using a display method similar to that of the first state. Since the display method of the running log is concise, easy to understand, and clear, the dispatching management personnel may quickly determine the problem through simple observation and judgment.

In some embodiments of the present disclosure, the method for generating a running log further includes: sending the running log information to the cloud storage device or the local storage device for storage. A file format of the running log information stored in the local storage device or the cloud storage device is not limited, for example, the running log information may be stored in a text format or in a data table format. The running log information is stored in the local storage device or the cloud storage device, which can be used as a historical running log and is convenient for dispatching management personnel to refer to and use in the future.

Figure 5:
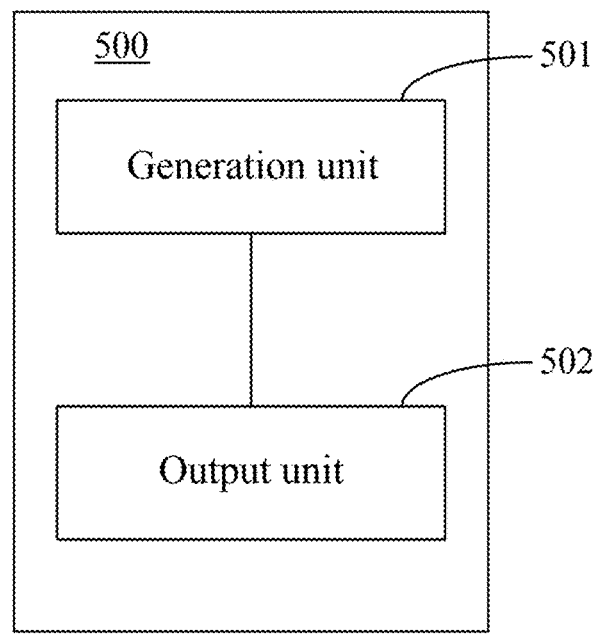
FIG. 5 is structural block diagram of an apparatus for generating a running log for an autonomous vehicle according to an embodiment of the present disclosure.

As shown in FIG. 5, the embodiments of the present disclosure further provide an apparatus 500 for generating a running log for an autonomous vehicle, the apparatus including a generation unit 501 and an output unit 502.

The generation unit 501 is configured to generate running log information based on task recognition information and at least one running event of each of at least one autonomous vehicle.

The output unit 502 is configured to display a graphical interface corresponding to the running log information, where for each autonomous vehicle of the at least one autonomous vehicle. The graphical interface includes a task element and at least one event element that are configured for the autonomous vehicle, where the task element includes the respective task recognition information of the autonomous vehicle. The at least one event element corresponds to the at least one respective running event of the autonomous vehicle, respectively, and the at least one event element is associated with the task element.

In some embodiments, the apparatus for generating a running log further includes: an extraction unit configured to extract the corresponding task recognition information based on dispatching information of each of the at least one autonomous vehicle.

In some embodiments, the apparatus for generating a running log further includes: an obtaining unit configured to obtain dispatching information of each of the at least one autonomous vehicle, where the output unit is configured to: for each of the at least one autonomous vehicle, in response to determining that a first running event of the at least one corresponding running event matches the respective dispatching information of the autonomous vehicle, display a first event element corresponding to the first running event in the graphical interface in a first state; and in response to determining that the first running event does not match the respective dispatching information, display the first event element corresponding to the first running event in the graphical interface in a second state, where the second state is different from the first state.

In some embodiments, the at least one running event includes at least one of the following: start of running, end of running, departure, arrival, temporary stop, on-site shutdown, cancellation of running, being overtaken, or overtaking.

In some embodiments, the at least one event element is sequentially arranged in the graphical interface, based on a time at which each of the at least one event element occurs.

In some embodiments, the graphical interface further includes a timeline element.

In the technical solutions of the embodiments of the present disclosure, the running log information related to the at least one autonomous vehicle is output and displayed in a form of a graphical interface on a display terminal. In the graphical interface, each event element corresponding to each autonomous vehicle is centered on a task element and is associated with the task element. A display scheme of the running log is clear, concise, and easy to understand. Compared with the related art, the technical solutions of the embodiments of the present disclosure enable dispatching management personnel to quickly know key content of the running log, thereby improving the efficiency of dispatching management and problem diagnosis for autonomous vehicles, and further ensuring the reliable, safe, and efficient running of the autonomous vehicles.

According to the embodiments of the present disclosure, an electronic device, a computer-readable storage medium, and a computer program product are further provided.

Figure 6:
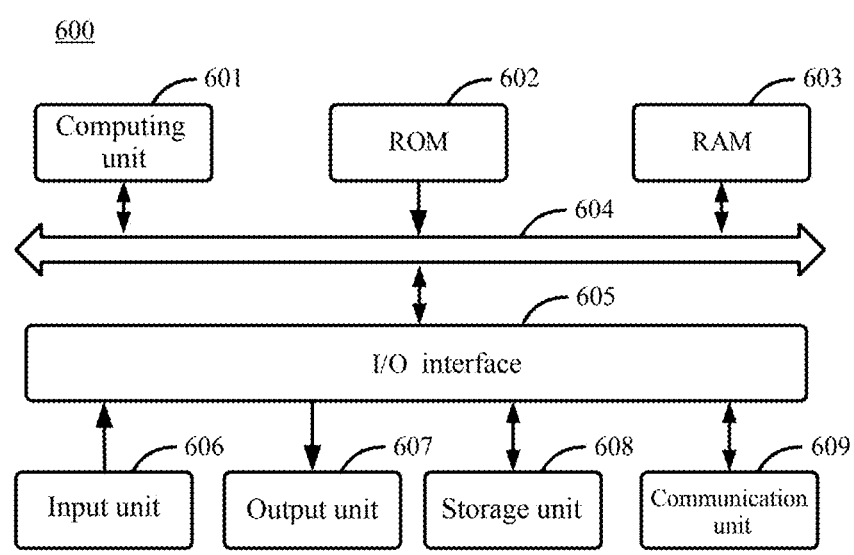
FIG. 6 is a structural block diagram of an electronic device according to an embodiment of the present disclosure.

Referring to FIG. 6, a structural block diagram of an electronic device 600 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 6, the electronic device 600 includes a computing unit 601, which may perform various appropriate actions and processing according to a computer program stored in a read-only memory (ROM) 602 or a computer program loaded from a storage unit 608 to a random access memory (RAM) 603. The RAM 603 may further store various programs and data required for the operation of the electronic device 600. The computing unit 601, the ROM 602, and the RAM 603 are connected to each other through a bus 604. An input/output (I/O) interface 605 is also connected to the bus 604.

A plurality of components in the electronic device 600 are connected to the I/O interface 605, including: an input unit 606, an output unit 607, the storage unit 608, and a communication unit 609. The input unit 606 may be any type of device capable of entering information to the electronic device 600. The input unit 606 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 607 may be any type of device capable of presenting information, and may include, but is not limited to, a display, a speaker, a video/audio output terminal, a vibrator, and/or a printer. The storage unit 608 may include, but is not limited to, a magnetic disk and an optical disc. The communication unit 609 allows the electronic device 600 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, an 802.11 device, a Wi-Fi device, a WiMAX device, a cellular communication device, and/or the like.

The computing unit 601 may be various general-purpose and/or special-purpose processing components with processing and computing capabilities. Some examples of the computing unit 601 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 601 performs the various methods and processing described above. For example, the method in some embodiments may be implemented as a computer software program, which is tangibly contained in a machine-readable medium, such as the storage unit 608. In some embodiments, a part or all of the computer program may be loaded and/or installed onto the electronic device 600 via the ROM 602 and/or the communication unit 609. When the computer program is loaded onto the RAM 603 and executed by the computing unit 601, one or more steps of the method of the embodiments described above can be performed. Alternatively, in other embodiments, the computing unit 601 may be configured, by any other suitable means (for example, by means of firmware), to perform the method of the embodiments described above.

An embodiment of the present disclosure further provides a computer-readable storage medium storing computer instructions, where the computer instructions are configured to cause a computer to perform the steps of the method described in any one of the foregoing embodiments.

In addition, an embodiment of the present disclosure further provides a computer program product, including a computer program, where the computer program, when executed by a processor, implements the steps of the method described in any one of the foregoing embodiments.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flow-charts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely example embodiments or examples, and the scope of the present disclosure is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A method for generating a running log for an autonomous vehicle, the method comprising:
generating running log information based on task recognition information and at least one running event of each autonomous vehicle of at least one autonomous vehicle;
displaying a graphical interface corresponding to the running log information; and
obtaining dispatching information of each autonomous vehicle of the at least one autonomous vehicle;
wherein the graphical interface is a human-machine interaction interface displayed in a form of graphics and is output and displayed on a display terminal;
wherein, for each autonomous vehicle of the at least one autonomous vehicle, the graphical interface includes a task element and at least one event element that are configured for the autonomous vehicle;
wherein the task element includes the task recognition information of the autonomous vehicle; and
wherein the at least one event element corresponds to the at least one running event of the autonomous vehicle, respectively, and the at least one event element is associated with the task element;
wherein the at least one event element is sequentially arranged in the graphical interface based on a time at which the at least one running event corresponding to each event element of the at least one event element occurs; and
wherein the displaying the graphical interface corresponding to the running log information comprises:
for each autonomous vehicle of the at least one autonomous vehicle:
displaying, in response to determining that a first running event of the at least one running event matches the dispatching information of the autonomous vehicle, a first event element corresponding to the first running event in the graphical interface in a first state; and
displaying, in response to determining that the first running event does not match the dispatching information, the first event element corresponding to the first running event in the graphical interface in a second state, wherein the second state is different from the first state;

wherein shapes of the first state and the second state are different in the graphical interface; and wherein, in response to determining that the graphical interface comprises the second state, adjusting a running plan of the autonomous vehicle corresponding to the second state.

2. The method according to claim 1, further comprising: extracting, based on the dispatching information of each autonomous vehicle of the at least one autonomous vehicle, the task recognition information of the autonomous vehicle.

3. The method according to claim 1, wherein the at least one running event comprises at least one of:

start of running, end of running, departure, arrival, temporary stop, on-site shutdown, cancellation of running, being overtaken, or overtaking.

4. The method according to claim 1, wherein the graphical interface further includes a timeline element.

5. An electronic device, comprising:
at least one processor; and
a memory communicatively connected to the at least one processor, wherein the memory stores instructions executable by the at least one processor, wherein the instructions, when executed by the at least one processor, cause the at least one processor to perform actions including:
generating running log information based on task recognition information and at least one running event of each autonomous vehicle of at least one autonomous vehicle;
displaying a graphical interface corresponding to the running log information; and
obtaining dispatching information of each autonomous vehicle of the at least one autonomous vehicle;
wherein the graphical interface is a human-machine interaction interface displayed in a form of graphics and is output and displayed on a display terminal;
wherein, for each autonomous vehicle of the at least one autonomous vehicle, the graphical interface includes a task element and at least one event element that are configured for the autonomous vehicle;
wherein the task element includes the task recognition information of the autonomous vehicle;
wherein the at least one event element corresponds to the at least one running event of the autonomous vehicle, respectively, and the at least one event element is associated with the task element;
wherein the at least one event element is sequentially arranged in the graphical interface based on a time at which the at least one running event corresponding to each event element of the at least one event element occurs; and
wherein the displaying the graphical interface corresponding to the running log information comprises:
for each autonomous vehicle of the at least one autonomous vehicle,
displaying, in response to determining that a first running event of the at least one running event matches the dispatching information of the autonomous vehicle, a first event element corresponding to the first running event in the graphical interface in a first state; and displaying, in response to determining that the first running event does not match the dispatching information, the first event element corresponding to the first running event in the graphical interface in a second state, wherein the second state is different from the first state;

wherein shapes of the first state and the second state are different in the graphical interface; and wherein, in response to determining that the graphical interface comprises the second state, adjusting a running plan of the autonomous vehicle corresponding to the second state.

6. The electronic device according to claim 5, wherein the actions further comprise:

extracting, based on the dispatching information of each autonomous vehicle of the at least one autonomous vehicle, the task recognition information of the autonomous vehicle.

7. The electronic device according to claim 5, wherein the at least one running event comprises at least one of:

start of running, end of running, departure, arrival, temporary stop, on-site shutdown, cancellation of running, being overtaken, or overtaking.

8. The electronic device according to claim 5, wherein the graphical interface further includes a timeline element.

9. A non-transitory computer-readable storage medium storing computer instructions, wherein the computer instructions, when executed by a computer, cause the computer to perform actions including:

generating running log information based on task recognition information and at least one running event of each autonomous vehicle of at least one autonomous vehicle;

displaying a graphical interface corresponding to the running log information; and obtaining dispatching information of each autonomous vehicle of the at least one autonomous vehicle;

wherein the graphical interface is a human-machine interaction interface displayed in a form of graphics and is output and displayed on a display terminal;

wherein, for each autonomous vehicle of the at least one autonomous vehicle, the graphical interface includes a task element and at least one event element that are configured for the autonomous vehicle;

wherein the task element includes the task recognition information of the autonomous vehicle; and wherein the at least one event element corresponds to the at least one running event of the autonomous vehicle, respectively, and the at least one event element is associated with the task element;

wherein the at least one event element is sequentially arranged in the graphical interface based on a time at which the at least one running event corresponding to each event element of the at least one event element occurs; and wherein the displaying the graphical interface corresponding to the running log information comprises:
for each autonomous vehicle of the at least one autonomous vehicle,
displaying, in response to determining that a first running event of the at least one running event matches the dispatching information of the autonomous vehicle, a first event element corresponding to the first running event in the graphical interface in a first state: and displaying, in response to determining that the first running event does not match the dispatching information, the first event element corresponding to the first running event in the graphical interface in a second state, wherein the second state is different from the first state;

wherein shapes of the first state and the second state are different in the graphical interface; and wherein, in response to determining that the graphical interface comprises the second state, adjusting a running plan of the autonomous vehicle corresponding to the second state.

10. The non-transitory computer-readable storage medium according to claim 9, wherein the actions further comprise:

extracting, based on the dispatching information of each autonomous vehicle of the at least one autonomous vehicle, the task recognition information of the autonomous vehicle.

11. The non-transitory computer-readable storage medium according to claim 9, wherein the at least one running event comprises at least one of:

start of running, end of running, departure, arrival, temporary stop, on-site shutdown, cancellation of running, being overtaken, or overtaking.

12. The non-transitory computer-readable storage medium according to claim 9, wherein the graphical interface further includes a timeline element.

* * * * *